United States Patent [19]

Diepers et al.

[11] 3,900,947

[45] Aug. 26, 1975

[54] METHOD FOR THE MANUFACTURE OF A TUBULAR CONDUCTOR USEFUL FOR SUPERCONDUCTING CABLES

[75] Inventors: Heinrich Diepers, Erlangen-Bruck; Horst Müsebeck, Erlangen, both of Germany

[73] Assignee: Siemens Aktiengesellschaft, Munich, Germany

[22] Filed: Feb. 26, 1974

[21] Appl. No.: 446,092

[30] Foreign Application Priority Data

Mar. 9, 1973 Germany ........................... 2311875

[52] U.S. Cl. .............. 29/599; 29/527.5; 29/DIG. 8; 164/80; 164/98; 174/126 CP

[51] Int. Cl. ............................................ H01v 11/14

[58] Field of Search .... 29/599, 527.4, 527.2, 527.5, 29/DIG. 5, DIG. 8, DIG. 11; 164/51, 80, 98, 251; 174/126 CP, DIG. 6

[56] References Cited

UNITED STATES PATENTS 3,707,035 12/1972 Alger et al. ........................ 164/80 X
3,818,578 6/1974 Raymond et al. .................. 29/527.5

FOREIGN PATENTS OR APPLICATIONS 566,567 11/1958 Canada ............................ 29/527.4

OTHER PUBLICATIONS

C. Graeme-Barber et al., "Tubular Niobium/Copper Conductors for AC Superconductive Power Transmission," Cryogenics, Vol. 12, No. 4, Aug. 1972.

*Primary Examiner*—C. W. Lanham
*Assistant Examiner*—D. C. Reiley, III
*Attorney, Agent, or Firm*—Kenyon & Kenyon Reilly Carr & Chapin

[57] ABSTRACT

A method for manufacturing a tubular conductor consisting of a niobium layer and a copper layer, in which a layer of electrolytic copper is melted onto one side of a niobium tube in a vacuum with the residual gas pressure of no more than $10^{-4}$ Torr and a tube section thus produced, drawn in several cold drawing passes to reduce the outside diameter and wall thickness of the tube to form a longer tube, to thereby permit easy production of a seamless tube, particularly useful for superconducting cables, which tube has good mechanical, thermal and electrical contact between the niobium and copper layers.

14 Claims, 4 Drawing Figures

METHOD FOR THE MANUFACTURE OF A TUBULAR CONDUCTOR USEFUL FOR SUPERCONDUCTING CABLES

BACKGROUND OF INVENTION

This invention relates to the production of tubular conductors which consist of a niobium layer and a copper layer, and more particularly, to an improved method for making such conductors, which conductors are particularly useful in superconducting cables.

It is well known that niobium is eminently suitable as a superconductor material for superconducting cables which are used for transmitting large amounts of electrical energy. In particularly, its application for superconducting single- and three-phase cables is known. Niobium has a very high lower critical magnetic field $H_{c1}$ of about 120,000 A/m and relatively low a-c losses as long as this critical magnetic field is not exceeded. In superconducting cables, niobium can be used to advantage in the form of a thin layer applied to a tubular carrier of a metal such as copper, which at the temperature required for maintaining superconductivity of the niobium, i.e., about 4 to 5 K, is electrically highly normal-conducting and has a high thermal conductivity. For superconducting single- or three-phase a-c cables, a coaxial arrangement of such copper tubes, each provided with a niobium layer externally or internally would seem to be particularly advantageous. Preferably, a niobium layer is provided on the outside of the inner tube and on the inside of the outer tube of a pair of coaxial conductors. By using the inner tube as the outgoing conductor and the outer tube as the return conductor, electric and magnetic fields will be maintained only in the space between the niobium layers with the copper tubes remaining free of fields, so that no eddy current losses will occur therein. In the operation of such cables, a cooling medium such as liquid helium, will be supplied so that it flows along, particularly within the tubular inner conductor and over the outside of the tubular outer conductor. In this manner, the cooling medium is in direct contact with the copper surface of each tube (see "Elektrotechnische Zeitschrift-Edition A," Vol. 92 (1971), p. 740 to 745.)

In tubular conductors of this nature having a niobium and a copper layer, the copper is used for electrical stabilization of the superconducting niobium in that, if the niobium changes over from superconducting to the electrically normal-conducting state, which can occur in the event of an overload, the copper is capable of carrying at least part of the current flowing in the superconducting niobium, and of transferring to the contiguous cooling medium the heat loss produced in the niobium or resulting from a-c losses. For this stabilization to be effective, the best possible electrical and thermal contact between the niobium layer and the copper is necessary. Additionally in such cables, the surface of the niobium layer should be as smooth and free of disturbances as possible, since the a-c losses occuring in the niobium in the superconducting state increase relatively steeply with increasing surface roughness of the niobium. Because when operating below the critical field intensity $H_{c1}$, the current flowing in the superconducting niobium layer flows only in a thin surface layer, which is generally less than about 0.1 $\mu$m, the niobium layer can be made relatively thin, for example, with a thickness of between about 0.1 and 0.01 mm. By doing so, a large savings of expensive material is obtained.

The manufacture of tubular conductors of this type which have a niobium and a copper layer, involves great difficulties, since a good electrical and thermal contact between niobium and copper is very difficult to obtain and furthermore, because the mechanical union between niobium and copper breaks easily, for example, in the event of deformation causing the niobium layer to chip off the copper layer. The good surface quality is referred to above, in order to keep a-c losses at a minimum, which are difficult to obtain.

A method of depositing relatively pure and well-adhering niobium layers on a suitable carrier such as copper has been disclosed in an article by Mellors and Senderoff in "Journal of the Electrochemical Society," Vol. 112 (1965) p. 266 to 272. In the method disclosed therein, a niobium layer is deposited by fusion electrolysis from a melt consisting mainly of alkali fluorides and a niobium fluoride. However, the application of this method for the deposition of niobium onto copper tubes of great length such as those required for cables in order to avoid unnecessary welded joints, involves great difficulties. The tubes to be plated would have to be introduced into a molten electrolyte having a temperature of at least approximately 740°C through a vacuum-tight air lock. Furthermore, in a fusion-electrolysis plating process, the application of a niobium layer to the inside of a long copper tube would involve additional problems because of insufficient accessibility.

A method of manufacturing tubular conductors having a niobium layer and a copper layer has been disclosed in U.S. Pat. No. 3,777,368 granted Dec. 11, 1973 and assigned to the same assignee as the present invention. In the method disclosed therein, a strip consisting of a niobium layer and a copper layer, and having niobium flanges at its edges is first produced, then bent to form a tube with the niobium flanges abutting and the niobium flanges then joined together by electron beam welding. While this method, which furnishes a tube having a welded seam is suitable for producing tubes for superconducting cables having a niobium and a copper layer, it is still relatively costly, particularly because of the bending and welding operations required.

Thus, it can be seen that there is a need for an improved and simplified method of manufacturing tubular conductors of this nature which consist of a niobium and copper layer, and in particular, such a method which permits manufacturing seamless tubes having good contact between the niobium and copper layers.

SUMMARY OF THE INVENTION

The present invention provides such a method in which electrolytic copper is melted onto one side of a tube of niobium in a vacuum with a residual gas pressure of no more than $10^{-4}$ Torr, to produce a layer of electrolytic copper on the niobium tube, after which, the tube so formed is drawn in several cold-drawing passes to reduce the outside diameter and wall thickness of the tube, while using drawing aids to form a longer tube.

Through this method of melting electrolytic copper onto the niobium tube in a vacuum with a gas pressure of no more than $10^{-4}$ Torr, an excellent thermal, electrical and mechanical bond between the niobium and the copper is obtained, which bond remains intact even during the relatively heavy deformation that occurs during cold drawing. In drawing experiments with tubes of niobium, onto which ordinary copper had been melted or onto which copper had been melted in a vacuum with a higher residual pressure, a useful tube was unobtainable because the niobium consistently chipped off the copper during drawing. Only with electrolytic copper was the excellent thermal, electrical and mechanical bond obtained. By electrolytic copper, what is meant, for purposes of the present invention, is the type of copper commercially available under this designation, which copper is electrolytically refined by repeated electrolysis or the like, and which preferably also has a low oxygen content and can thus be termed low-oxygen copper. The residual resistance ratio of such copper grades suitable for the method of the present invention, i.e., the ratio of resistivity of the copper at room temperature to its resistivity of a temperature of 4.2 K is, in the absence of an external magnetic field, usually at least about 400, and preferably about 800 or more.

To avoid too great a stress on the niobium layer and on the bond between the two metals obtained during melting, the wall thickness of the tube is reduced during the drawing process, preferably by no more than 20% per pass. In the interest of avoiding excessive material stresses on one hand, and still obtaining expedient manufacturing on the other hand, it is particularly advantageous to reduce the wall thickness of the tube by approximately 10% per pass.

In carrying out the method of the present invention, for fabricating a tube consisting of a niobium and a copper layer, a thin-walled niobium tube and a thicker wall copper tube, in one embodiment of the invention, are placed one inside the other and the copper surface away from the niobium provided with a support tube. The copper is then melted in a vacuum. The support tube, which can consist of nickel or V2A steel, for example, prevents the melted copper from running. In order to avoid the formation of voids within the copper layer or at the boundary between the niobium and the copper, the copper advantageously can be melted only in a narrow zone. With the axis of the tube vertical, the zone is moved from the lower end to the upper end of the tube. A further means of avoiding voids, which voids can cause the niobium to chip off or cause the tube to break open during drawing, comprises melting the copper completely with the axis of the tube vertical, and then letting it solidify from the lower end of the tube upward by lowering the tube, for example, tubular furnace into a cooler zone located below.

A further embodiment of the invention describes a method in which the tube section consisting of a niobium and a copper layer without voids is formed by first forming a cylindrical, double-walled mold, whose one wall consists of the niobium tube and the other wall of a support tube. Melted copper is then poured into the cold mold in a vacuum and the copper then solidifies in the mold from the bottom up.

The support tube, which prevents the copper from running in the fabrication of the tube section, is then preferably removed prior to the drawing by turning.

By melting a copper layer onto the niobium tube in a vacuum, a tube section can be fabricated, in which the niobium layer is on the outside of the copper, as well as the tube section in which the niobium layer is on the inside.

In practicing the method of the present invention, a drawing aid is needed during the drawing process. Its purpose, in particular, is to avoid excessive stress and heating of the metal due to the friction occuring, for example, at the dies. Excessive heating, particularly of the niobium layer, can lead to the absorption of atmospheric oxygen by the niobium layer and cause embrittlement of this layer.

For the copper side of the tube, ordinary drawing oil may be used as a drawing aid. However, on the niobium side of the tube, which should be as smooth and free of disturbances as possible to avoid a-c losses, a different drawing aid should be applied. Suitable drawing aids are, in particular, a lubricating layer of zapon varnish or lacquer or other fast-drying nitrocellulose lacquers. When drawing relatively long tubes, care should be taken to insure proper cooling of the dies, so that the lacquer does not heat up. Another suitable drawing aid is a niobium pentoxide layer, formed on the surface of the niobium layer by anodic oxidation, for example, in a 25% aqueous ammonia solution. Altenatively, a soap lubricant, such as zinc stearate can be applied as the drawing aid to the niobium side of the tube. Drawing oil may be used in addition to these drawing aids, which must be renewed after a few passes if necessary, due to stripping of the drawing aid.

The drawing of the tube consisting of a niobium and a copper layer over a round mandrel is particularly advantageous because of the great simplicity in this manufacturing process. The above described drawing aids, such as lacquers, niobium pentoxide layer or soap lubricant, need only be applied to the niobium layer if it is on the outside of the tube coming in contact with the die. If the niobium layer forms the inner cylindrical surface of the tube, only drawing oil need be used between the mandrel and the niobium layer. This is of great advantage since, as the tube becomes longer after several drawing passes, the internal niobium surface becomes less and less accessible for the application of drawing aids. On the other hand, if the tube is drawn, as is also possible, through the use of what is referred to as a floating or flying mandrel, the niobium layer must be supplied with one of the above described drawing aids even if it lies on the inside of the tube. In each instance, for the copper layer, drawing oil alone is sufficient regardless of whether it forms the inside or the outside of the tube. If the copper layer is on the inside and the drawing is performed over a round mandrel, it is advantageous to provide drawing oil between the copper layer and the mandrel.

DETAILED DESCRIPTION OF THE PREFERRED EMBODIMENT

Figure 1:
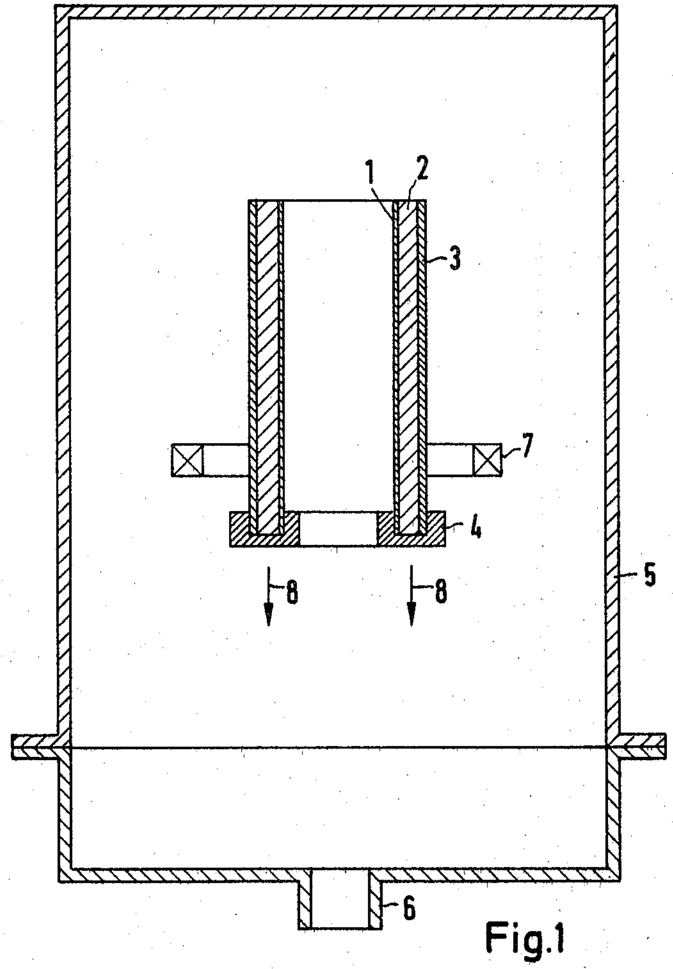
FIG. 1 is a schematic illustration of a first type of apparatus which can be used for carrying out the method of the present invention.

FIG. 1 illustrates a first type of apparatus which may be used for carrying out the method of the present invention. In the illustrated embodiment, a niobium tube 1 with a wall thickness of approximately 2 mm, for example, and a copper tube 2 having a thicker wall diameter of, for example, 20 mm, are placed inside each other. Typical dimensions of the tubes are as follows. The inside diameter of the inner tube can be 40 mm and the lengths of the tubes about 500 mm. A support tube 3 of V2A steel is then pushed over the surface of the copper tube facing away from the niobium. The lower part of the tube section assembled in this manner is then provided with a support ring 4, of, for example, niobium or V2A steel. The tube section so formed including the support ring, is then placed in a vacuum chamber 5 shown schematically on FIG. 1, which is then evacuated through a pipe connection 6 until a vacuum with a residual gas pressure of no more than $10^{-4}$ Torr is reached. Thereafter, a narrow zone is melted at the lower part of the copper tube 2 using a high-frequency heating coil 7. The melting zone is moved slowly through the copper tube from the bottom to the top by moving the assembled tubes 1 to 3 slowly downward in the direction of arrows 8 through the high-frequency heating coil. Alternatively, the high-frequency heating coil 7 can be moved upward with the tube section held stationary. In order to achieve a firm bond between the niobium and copper, it is sufficient if the niobium material of the niobium tube 1 is in contact for only a few seconds with the melted copper present within the melting zone. After cooling, the tube section is taken out of the vacuum chamber and the support tube 3 removed by turning or the like.

Figure 2:
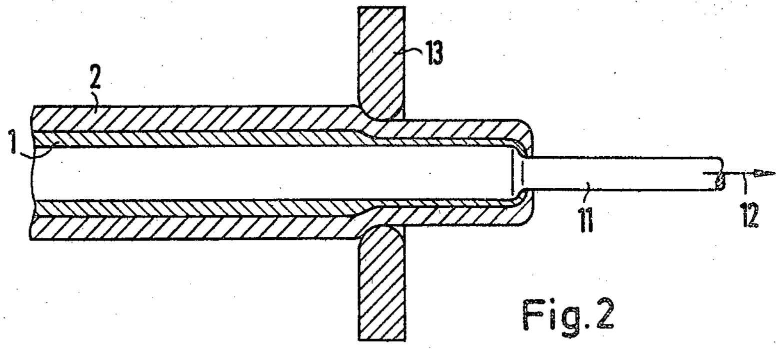
FIG. 2 is a cross sectional view illustrating the drawing of a tube according to the present invention with the niobium layer on the inside of the tube.

FIG. 2 illustrates the manner of cold-drawing a tube having niobium and copper layers with the niobium on the inside. As illustrated, the tube section with the niobium layer 1 and the copper layer 2 is placed on a round mandrel 11 made, for example, of hardened steel. The round mandrel is pulled in the direction of arrow 12 through a die 13 of hard metal or steel to form a tube of reduced diameter and reduced cross section. Drawing oil is applied as a drawing aid to the external copper cylindrical surface 2 of the tube section. In addition, the mandrel 11 is brushed with drawing oil before the tube section is slipped on, so that the oil also facilitates the sliding of the internal niobium layer 1 of the tube section on the mandrel during the drawing process. As noted above, the process comprises a plurality of cold-drawing passes such as that described above, in which the wall thickness of the tube and also its outside diameter are reduced. It is particularly advantageous, that the wall thickness reduction per pass be about 10%. The drawing is continued with changed dies 13 of increasingly smaller diameter until the wall thickness of the tube is reduced to about 5% of its original wall thickness. Drawing speed may be up to about 5 m/min. After such processing, the niobium layer will be about 0.1 mm thick, and the copper layer about 1mm thick. The length of the tube will have been stretched from its original length of 50 cm, to now be about 10 m long. The fully drawn down tube can then be stripped from the mandrel in conventional fashion by rolling-off, without breaking the firm bond between the niobium and the copper. The inside surface of the niobium, which has been pressed onto the very smooth surface of the mandrel 11 during the drawing, will also be very smooth in the finished tube and will exhibit very small a-c losses on the order of 0.5 $\mu W/cm^2$, for example, for a current of a frequency of 50 Hz.

A tube having a niobium layer on the outside and a copper layer on the inside may also be produced using the method described in connection with FIGS. 1 and 2. In that case, the initial assembly of the tubes 1, 2 and 3, would be opposite, i.e., the niobium tube 1 would be on the outside and the retaining tube of steel or the like 3, on the inside. When drawing the tube so formed over the mandrel 11, one of the above described drawing aids would be applied on the outside of the niobium layer as will be more fully described in connection with FIG. 4.

Figure 3:
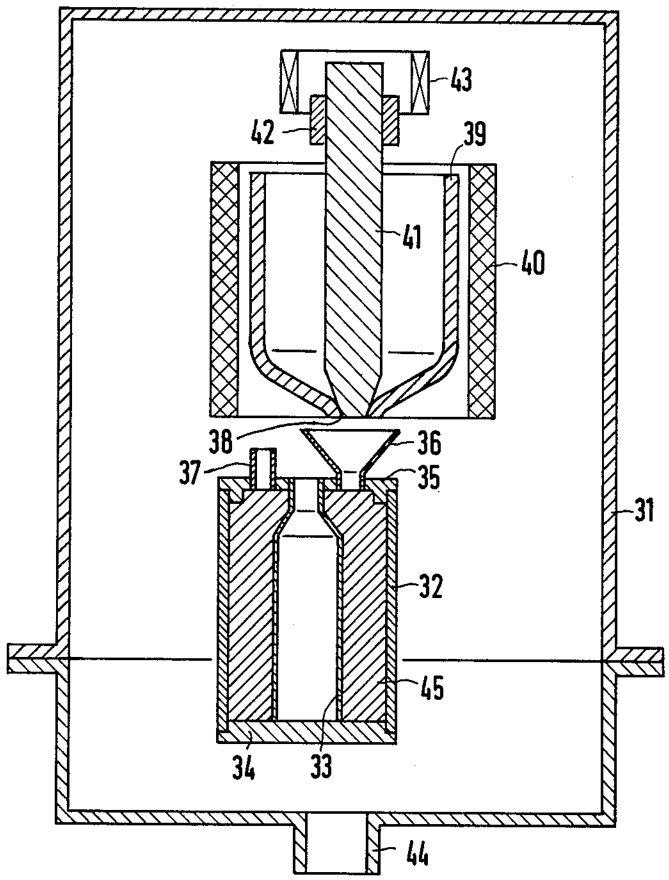
FIG. 3 illustrates a second embodiment of apparatus which may be used for forming a tube according to the present invention.

FIG. 3 illustrates a second method of forming a tube according to the present invention. Contained within a vacuum chamber 31, is a double-walled mold comprising an outer wall 32 in the form of a niobium tube having a wall thickness of about 1 mm, a diameter of 50 mm and a length of about 500 mm. The inner wall of the mold consists of a support tube 33 of V2A steel. At the low end, the mold is provided with a niobium bottom 34, which may, for example, be welded to the niobium tube 32. At the top, the mold is closed off by a lid 35 of V2A steel, into which a pouring funnel 36 and a riser 37 are inserted. Above the pouring funnel 36 is a crucible 39 which may consist of graphite which is provided with an outlet spout 38, aligned with the funnel 36. The graphite crucible is surrounded by a high-frequency heating coil 40. A graphite rod 41 is used to close off the outlet spout 38 of the crucible 39. Graphite rod 41 has an iron core 42 attached to its upper end which can cooperate with the magnetic coil 43 to pull the rod 41 upward, to open the outlet spout 38 of the crucible 39.

After the crucible 39 has been filled with low-oxygen copper which has been electrolytically refined several times, the vacuum chamber is evacuated through pipe connection 44 until a vacuum with a residual gas pressure of less than $10^{-4}$ Torr is reached. The graphite crucible 39 is then heated using the high-frequency heating coil until it reaches a temperature above the melting temperature of copper, for example, to about 1,150°C in order to melt the copper within the crucible. When the copper in the melting crucible 39 is completely liquified, the graphite rod 41 is pulled up through the energization of coil 43, and the copper allowed to run through the pouring funnel 36 into the cold, i.e., unheated mold consisting of the parts 32 to 37. During the short time of pouring, while the liquid copper is in contact with the initially cold inside wall of the niobium tube 32, a mechanically strong diffusion bond is formed between the niobium and the copper, which bond will withstand the subsequent deformation passes without breaking.

When the copper has cooled down, the mold is taken out of the vacuum chamber and after the lids 34 and 35 are removed, the inner support tube is machined out, so that a tube section with the approximately 1mm thick niobium layer 32 on the outside and about 10 mm thick copper layer 45 on the inside is obtained.

The tube section then may be drawn by the method described in connection with FIG. 1 using a round mandrel to form a long tube, and a suitable drawing aid applied to the niobium layer, or may be drawn in the manner to now be described in connection with FIG. 4.

Figure 4:
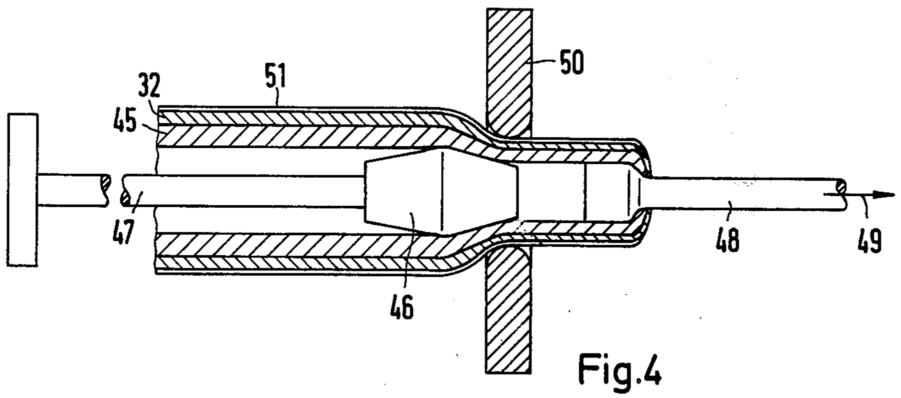
FIG. 4 is a cross sectional view illustrating a alternate method of drawing the tube, showing the drawing with the niobium layer on the outside.

FIG. 4 illustrates drawing through the use of a floating or flying mandrel 46 which can be held on one side by means of a mandrel anchor 47. The one end of the tube section consisting of the layers 32 and 45 is pressed onto a drawing-out device 48 and then pulled through the annular opening between the mandrel 46 and a drawing ring 50 in several cold-drawing passes in the direction of arrow 49. Drawing oil applied to the copper layer 45 as a drawing aid. The niobium layer on the outside of the tube is coated, for example, with a layer of zapon varnish. The tube section prepared in this manner is then drawn in several cold-drawing passes to form a longer tube. The reduction of wall thickness of the tube per pass is preferably maintained at about 10%. According to the example of the embodiment of FIG. 4, the inside diameter of the tube is also reduced, in addition to the outside diameter. After every two drawing passes, the layer of zapon varnish 51 is stripped from the niobium surface 32 with acetone or the like, and a new layer of lacquer applied. The drawing is continued until the wall thickness of the tube is about 10% of the original wall thickness. At that time, the niobium layer 32 will be about 0.1 mm thick, and the copper layer 45 about 1 mm thick. In addition to the zapon varnish, drawing oil can also be applied to the outer surface of the niobium tube as a drawing aid. The drawing speed can then be up to about 5 m/min.

As described above, the niobium layer 32 may alternatively be coated with a niobium pentoxide layer instead of the zapon varnish. Such layer may be obtained by anodic oxidation in a 25% aqueous ammonia bath, for example. Such a layer is amorphous and relatively soft and imparts good lubricating properties to the niobium surface. After about two or three cold-drawing passes, the niobium pentoxide layer is dissolved in hydrofluoric acid and the niobium surface again oxidized. As with the zapon varnish, drawing oil may additionally be used during drawing.

Another suitable drawing aid is a suspension of zinc stearate in denatured alcohol applied to the niobium cylinder surface prior to drawing.

Thus, as described above, the method of the present invention allows the production of long tubes from relatively short tube sections. When installing a superconducting cable, the long tube sections can be transported to the installation site and assembled there. It should be noted that the tubes produced by the method of the present invention can also be used as tubular superconductors for other purposes and for superconducting cables, such as, feed lines for microwave energy to superconducting cavity resonators and the like, when the niobium layer is on the inside. These and other modifications may be made without departing from the spirit of the invention which is intended to be limited solely by the appended claims.

What is claimed is:

1. The method for the manufacture of a tubular conductor consisting of a niobium layer and a copper layer, which conductor is particularly suitable for superconducting cables, comprising the steps of:

a. placing a tube of electrolytic copper and a niobium tube one inside the other;

b. providing a support tube on the side of the copper tube away from the niobium tube;

c. melting a layer of said electrolytic copper onto one side of said niobium tube by melting the copper in a narrow zone which is moved from the lower to the upper end of the tube while maintaining the axis of the tube vertical in a vacuum with a residual gas pressure of no more than $10^{-4}$ Torr; and d. drawing the tube so formed, using drawing aids, in a plurality of cold-drawing passes to reduce the outside diameter and wall thickness of the tube to form a longer tube.

2. The method according to claim 1 in which the wall thickness of the tube is reduced by no more than 20% per pass.

3. The method according to claim 2 wherein the wall thickness of the tube is reduced by approximately 10% per pass.

4. The method according to claim 1 wherein said support tube is removed from the copper layer prior to drawing.

5. The method according to claim 1 wherein drawing oil is used as the drawing aid on the copper side of the tube.

6. The method according to claim 1 wherein a lubricating layer of lacquer is applied to the niobium side of the tube as a drawing aid.

7. The method according to claim 6 wherein said lacquer is a fast drying nitrocellulose lacquer.

8. The method according to claim 7 wherein said fast drying nitrocellulose lacquer is zapon lacquer.

9. The method according to claim 1 and further including a step of forming a niobium pentoxide layer on the niobium side of the tube as a drawing aid.

10. The method according to claim 1 and further including the step of applying a soapy lubricant to the niobium side of the tube as a drawing aid.

11. The method according to claim 9 wherein said soapy lubricant is zinc stearate.

12. The method according to claim 1 wherein said tube is drawn over a round mandrel.

13. The method according to claim 1 wherein the niobium layer forms the inner cylindrical surface of the tube and drawing oil is provided as a drawing aid between the mandrel and the niobium layer.

14. The method according to claim 1 wherein the niobium layer forms the outer cylindrical surface of the tube.

* * * * *